United States Patent [19]

Huguet et al.

[11] Patent Number: 4,638,594
[45] Date of Patent: Jan. 27, 1987

[54] PROCESS AND APPARATUS FOR AUTOMATICALLY CONTROLLING THE IRRIGATION OF PLANTS

[75] Inventors: Jean-Gérard Huguet, Le Pontet; Bernard Jaussely, Montfavet, both of France

[73] Assignee: Institut National de la Recherche Agronomique, Paris, France

[21] Appl. No.: 698,590

[22] Filed: Feb. 5, 1985

[30] Foreign Application Priority Data

Feb. 9, 1984 [FR] France ................................ 84 02020

[51] Int. Cl.$^4$ ............................................. A01G 25/16
[52] U.S. Cl. ...................................... 47/1 R; 47/48.5; 47/58
[58] Field of Search .................. 47/1, 48.5, 58, 79; 73/1 J; 33/169 R, 143 R; 239/67; 248/219.4, 218.4, 219.1

[56] References Cited

U.S. PATENT DOCUMENTS

| 2,416,664 | 2/1947 | Ruge | 33/143 A |
| 3,797,121 | 3/1974 | Brunner | 33/169 R |

FOREIGN PATENT DOCUMENTS

| 193825 | 5/1967 | U.S.S.R. | 47/1 |
| 252340 | 2/1970 | U.S.S.R. | |
| 1017230 | 5/1983 | U.S.S.R. | |

OTHER PUBLICATIONS

Heilman et al (1968), "Adaptation of a Linear Transducer for Measuring Leaf Thickness", Agronomy Journal, vol. 60, Sep.–Oct. '68, pp. 578–579.
Powell and Thorpe, "Dynamic Aspects of Plant Water Relations", *Fifth Long Ashton Symposium*, Apr. 1975.
U.S. Department of Agriculture–Agricultural Research Device, "Pumping Air Through Leaves Indicates Plant Stress".

*Primary Examiner*—James R. Feyrer
*Attorney, Agent, or Firm*—Berman, Aisenberg & Platt

[57] ABSTRACT

The invention relates to a process for controlling irrigation in agriculture.

The object of the invention is to match the supply of water as closely as possible to the actual requirements of the plant. For this purpose, a pilot parameter linked to the water requirements and resources of the plant, preferably the diameter of a fruit, the trunk or a stem, is used to control irrigation. Daily variations consisting of a reduction in diameter in the middle of the day (1, 2) are preferably taken into account, and irrigation is triggered if this variation (3) exceeds a predetermined threshold.

22 Claims, 6 Drawing Figures

PROCESS AND APPARATUS FOR AUTOMATICALLY CONTROLLING THE IRRIGATION OF PLANTS

FIELD OF THE INVENTION

The present invention relates to a new process for controlling irrigation.

It has long been known that the proper time for irrigating a plot of cultivated land is decided by observing the appearance of the vegetation and, if appropriate, by taking climatic parameters into account in advance.

DESCRIPTION OF THE PRIOR ART

Recent methods make use of mathematical models which take into account the readings of sensors sensitive to variables linked to the soil, such as the relative humidity of the latter at different levels, and of sensors sensitive to variables linked to the atmosphere, such as temperature, sunlight, wind and air humidity. These methods encounter problems regarding the reliability of measurements made in the soil, the heterogeneousness of the latter and the inadequate knowledge of the underground behavior of the vegetation.

It therefore seems that it would be advantageous for it to be possible to control irrigation on the basis of a parameter linked to the behavior of the plant itself.

The most logical course would, of course, be to take as a basis a determination of the "water potential" of the plant, that is to say the pressure of the sap. Unfortunately, the only method of measurement which gives acceptable results is a destructive method which involves cutting part of the stem, enclosing the end of the remaining portion in a chamber, the pressure of which is varied up to the limit at which a meniscus appears on the cut surface. Such a method is difficult to put into practice when automatic control is to be adopted.

A paper presented by Messrs. D.B.B. Powell and Martin René Thorpe at the Fifth Long Ashton Symposium on 12th–17th April 1975, entitled "Dynamic aspects of plant water relations", describes an experiment conducted over a period of 16 consecutive hours and involving determining at the same time the variations in diameter of the trunk and fruit on an apple tree and the variations in the water potential over that part of the day when the sun is risen. These researchers noted that these parameters show measurable variations (see FIG. 1), but that there is only a very approximate correlation between them: the water potential begins to decrease as soon as light appears and has a minimum at around 2 p.m., and subsequently increases until around 8 p.m.; the diameter of the trunk also begins to decrease from 6 a.m. and has a minimum at around 12, well before that of the water potential, and a maximum at around 6 p.m.; the diameter of the fruit starts to decrease only at around 8.30 a.m., well after that of the trunk, and it has a minimum at the same moment as that of the trunk, followed by an approximately uniform increase until the end of the day.

This experiment only makes it possible to ascertain that there is no close correlation between the measured variables. It is foreseen that insufficient irrigation will have an effect on the water potential, but it is not possible to know in what way this may affect the other measured variables.

Thus, to the inventors' knowledge, the prior art does not contain or suggest any method making it possible to control the irrigation of plants in any way other than on the basis of empirical observations or inaccurate mathematical models.

GENERAL DESCRIPTION OF THE INVENTION

The object of the present invention is to provide an effective process for controlling irrigation, which meets the actual requirements of the plants, so that feeding can be adjusted more accurately than at the present time in order to satisfy these requirements.

The invention therefore provides a process for the irrigation of plant crops, which involves the following stages:
(a) measurement of the daily variations in a parameter linked to the water requirements and resources of a specific part of the plant,
(b) determination of the maximum amplitude of daily variations in this parameter, corresponding to the absence of any need for irrigation, the climatic influences being taken into account;
(c) the fixing of a threshold for the said parameter, so that if this parameter exceeds the said threshold it can be presumed that there is a deficiency of irrigation;
(d) the triggering of irrigation, controlled by a signal indicating that the said threshold has been exceeded.

According to a procedure preferred in fruit crops, the said parameter which is the subject of the measurements is the diameter of a fruit, and the said threshold corresponds to a reduction in this diameter.

According to another procedure suitable for nonfruit crops or for those where the fruit is small or of difficult access, the said parameter which is the subject of the measurements is the diameter of the trunk or of a stem, and the said threshold corresponds to a reduction in this diameter.

According to a first mode of operation, the said parameter is measured on a part of the plant which has been isolated from photosynthesis, and the threshold is fixed by taking as a starting-point the value of the said parameter at the moment of the operation of isolation from photosynthesis.

According to a generally preferred mode of operation, which is a little more complicated as regards the equipment used, but which is simpler to put into practice in the field, the said parameter is measured on a part of the plant which remains in communication with photosynthesis, and the threshold is fixed by taking as a starting-point a value of the said parameter taken from the preceding daily variation, preferably an extreme value reached during the preceding night (from 0 hour onwards).

Advantageously, in this case, the starting-point for fixing the threshold corresponds to a maximum for the said parameter, if a deficiency of irrigation results in a reduction in the value of this parameter.

To ensure an advantageous simplification, the triggering of irrigation will correspond to the delivery of a predetermined fixed quantity of water onto or into the soil.

The invention also provides an apparatus for carrying out the process described above, this apparatus comprising:
a displacement sensor;
means of supporting the sensor in a fixed position relative to the part of the plant, of which the variations in diameter are measured;

a comparator to compare the signals emitted by the sensor with signals corresponding to the threshold value, indicating the need for irrigation;

means of transmitting control signals in response to signals from the said comparator;

at least one irrigation control valve responding to the said control signals.

Advantageously, the apparatus also incorporates a control system which operates in periods of 24 hours and which is capable of determining the value corresponding to the maximum diameter during the first 12 hours and of determining the threshold value by substracting a predetermined quantity from the said maximum.

An important element of the apparatus according to the invention is the dimension sensor sensitive to the variations in diameter of the fruit or stem, branch or trunk. These variations are of the order of approximately 10 to a few hundred micrometers during one and the same day, and it is therefore necessary for it to be possible to detect variations with a minimum accuracy of a few microns, or else a fraction of a micron, not under the still conditions of a laboratory, but in the open air, the article to be studied consequently being subjected to external stresses, such as rain and sun, and above all sometimes being shaken very violently by the wind which can cause impacts with other branches. Displacement sensors which can be used within the measuring range in question are to be found in the trade, but to the inventors' knowledge there are no means capable of maintaining them in an invariable position relative to the article to be studied, under the difficult conditions just described, if it is remembered that a relative displacement of one micrometer is of the order of magnitude of the phenomena which are to be measured.

It may be added that strain gauges have proved useless because of the difficulties of bonding them to the surface of a living organism, whilst at the same time ensuring lasting adhesion and the absence of any interference reaction in this organism itself.

An object of the present invention is to provide a solution to this problem and provide a sensor of dimensional variations which has suitable accuracy and at the same time acceptable reliability even in very bad weather.

The invention consequently provides an apparatus of the type mentioned above, and in which the displacement sensor comprises:

a means of measuring linear displacement, consisting of a first component movable linearly relative to a second component, and means sensitive to the relative linear displacements of the first component and second component;

a support capable of maintaining the said first component in an invariable position relative to a first part of the article to be studied; and a retention means capable of maintaining the said second component in an invariable position relative to a second part of the article to be studied, the relative variations in position of the said first and second parts of the article to be studied constitute the said dimensional variations to be detected, the particular feature of this sensor being that the support comprises a rigid ring made of a material having a low coefficient of expansion and integral with the said first component, and elastic means capable of permanently exerting on an article to be studied a force which tends to push the said article towards a zone of the said ring which is approximately diametrically opposite the said first component.

Advantageously, when the sensor is intended for interacting with an article of an approximately spherical general shape, such as a fruit, there is a bearing piece having approximately the shape of a circular collar, located in a plane perpendicular to that of the ring, and its axis being directed towards the first component, this bearing piece being integral with the said ring.

Preferably, in this case, the said elastic means consist of several springs placed at different locations on the ring and exert forces converging towards the center of the ring, and the position of the bearing piece is adjustable to make it possible to immobilize the article to be studied approximately in the center of the ring.

Advantageously, when the sensor is intended particularly for interacting with an elongate article, such as a branch, in the zone of the said ring which is diametrically opposite the first component, the ring has a V shape with a minimum radius less than that of the article to be studied.

Preferably, in this case, the ring has a considerable length in relation to its diameter and extends on either side of the location of the first component, and the elastic means comprise at least two springs placed on either side of the first component in the longitudinal direction of the ring.

In both cases, experience has shown that it is preferable to ensure that the retention means for retaining the second component relative to the second part of the article comprise an adhesive means placed between the said second component and the said second part. In fact, the conventional technique using a spring has proved ineffective when shaking is present.

Another device for sensing the diameter of a fruit, stem, branch or trunk can, more simply, comprise a resilient bracelet, placed for encompassing the member for which it is desired to detect the dimensional variations and provided with strain gauges sensible to a variation of length or shape of said bracelet. Such a device is well adapted when the studied element has a smooth and sliding surface.

However, with a raught surface, the obtained results are less good, since extension and/or retraction of the bracelet can be discontinuous. The bracelet may consist of a resilient metallic member in form of a non-closed annulus, which engages said studied element by two or more places of its internal face.

BRIEF DESCRIPTION OF THE DRAWINGS

The invention will now be described in more detail by means of practical examples illustrated in the drawings in which.

DETAILED DESCRIPTION

Figure 1:
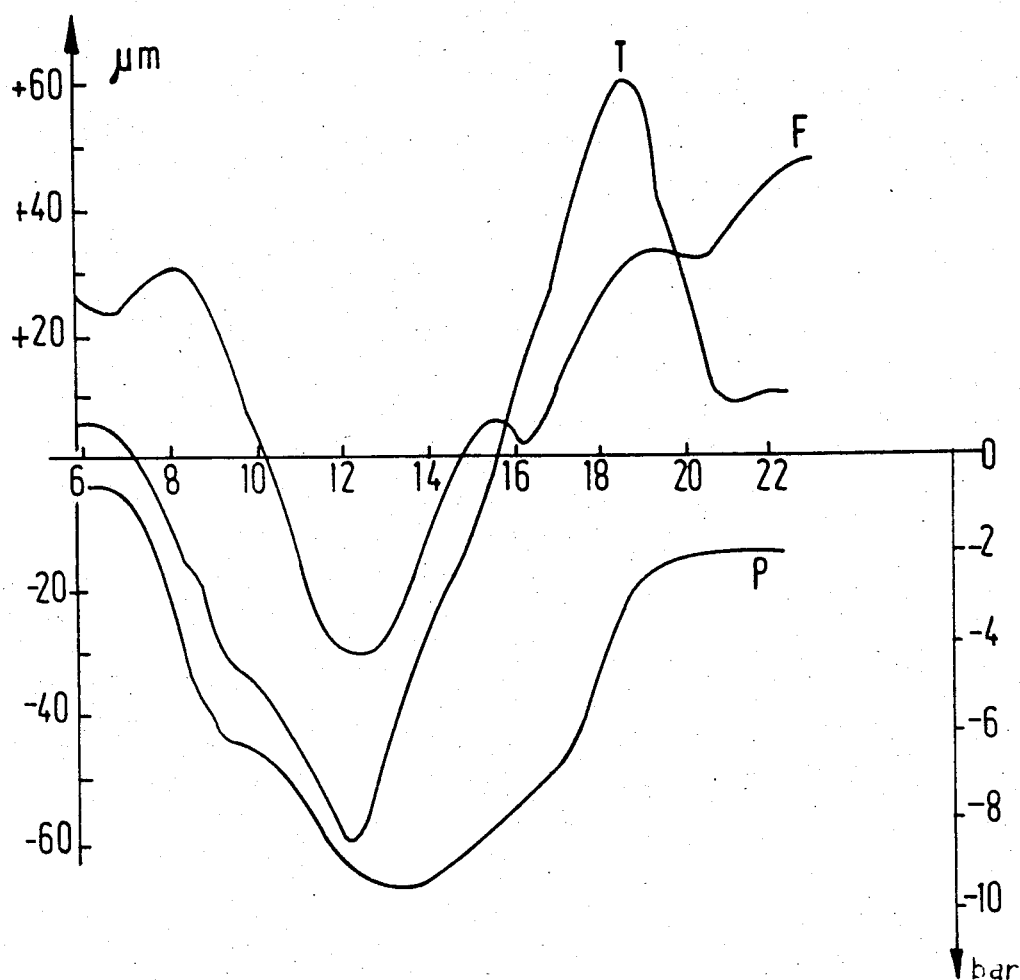
FIG. 1 is a graph showing the variations in the water potential and in the diameters of a trunk and fruit as a function of time.

FIG. 1 is taken from the publication of Powel and Thorpe mentioned above, the curves T and F showing the daily variations in diameter in micrometers, and the curve P showing the variations in the water potential in bars, in the course of the experiment.

The studies made by the inventors have made it possible to generally understand the reasons for the poor correlation observed between the water potential and the dimensions of the plant. Of these reasons, the main one must be sought in the exchanges which take place, for example, between the fruit and the leaves, these exchanges relating to transfers of sugar and other nutritive substances from the leaves, where they are prepared by means of photosynthesis, to the fruit, and also to transfers of water in the opposite direction when the supply coming from the roots is insufficient.

Figure 2:
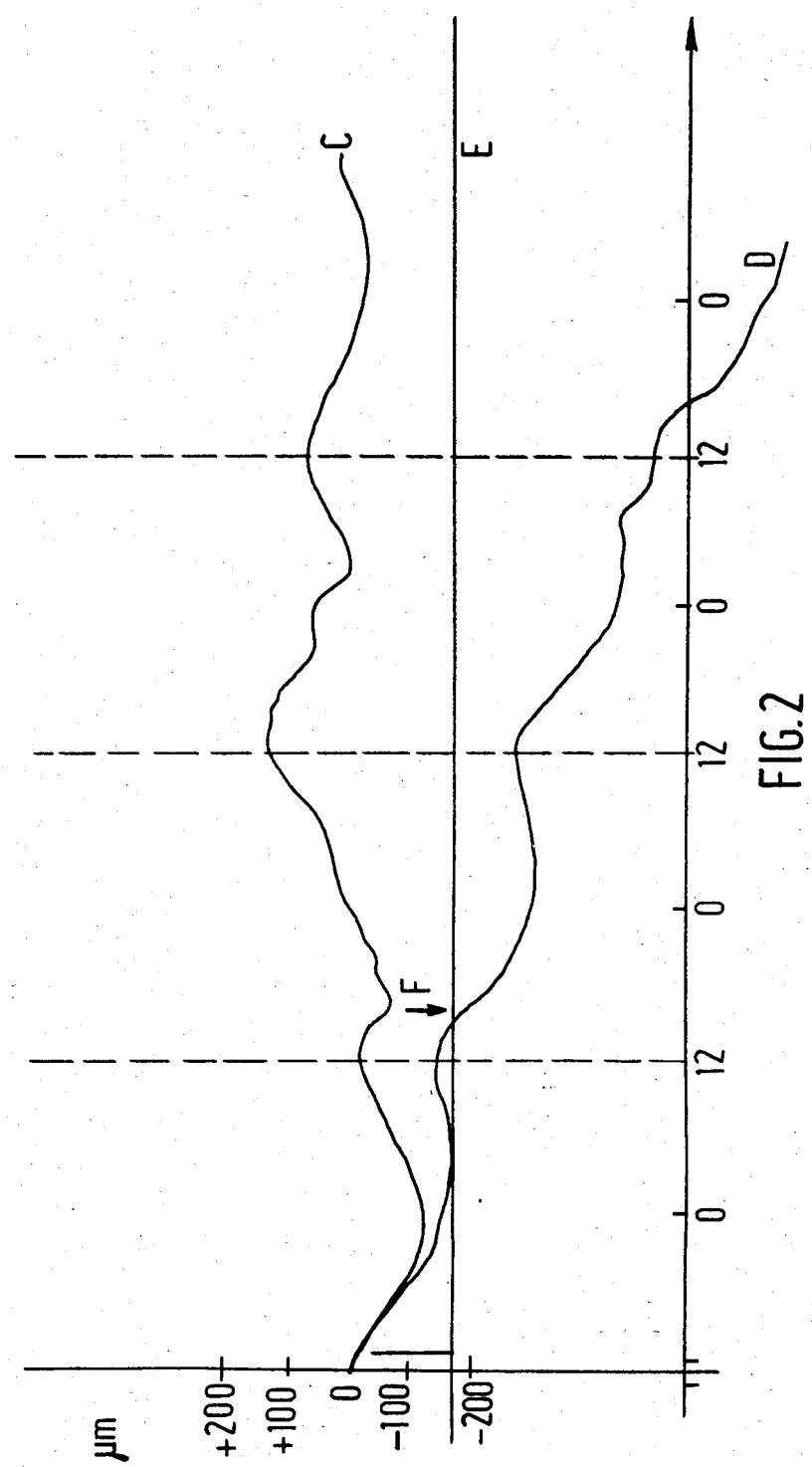
FIG. 2 is a graph showing the variations in diameter of fruit as a function of time.

FIG. 2 shows the result of an experiment conducted by the inventors: fruit was isolated from photosynthesis when the leaves of the branch carrying them were removed and when a ring of bark at the base of this branch was severed. It was then noted that, under normal irrigation conditions (curve C) the growth of the fruit was interrupted and its diameter remained approximately constant with only daily variations. On the contrary, if the plant suffers from insufficient irrigation (curve D), the dimensions of the fruit show a uniform decrease, on which are superimposed daily amplitude variations which are comparable to those observed with normal irrigation.

It is possible to deduce from this experiment a method of giving the alarm in the event of a deficiency of irrigation and, if appropriate, of controlling the delivery of water to the plant. This method involves isolating a fruit from photosynthesis, for example in the way indicated above, observing or recording the variations in diameter of the fruit and triggering the alarm and/or the start of irrigation when this diameter falls below a predetermined threshold (the straight line E and the arrow F). However, this method is difficult to put into practice, since the operation of isolating a fruit from photosynthesis requires experienced personnel.

Figure 3:
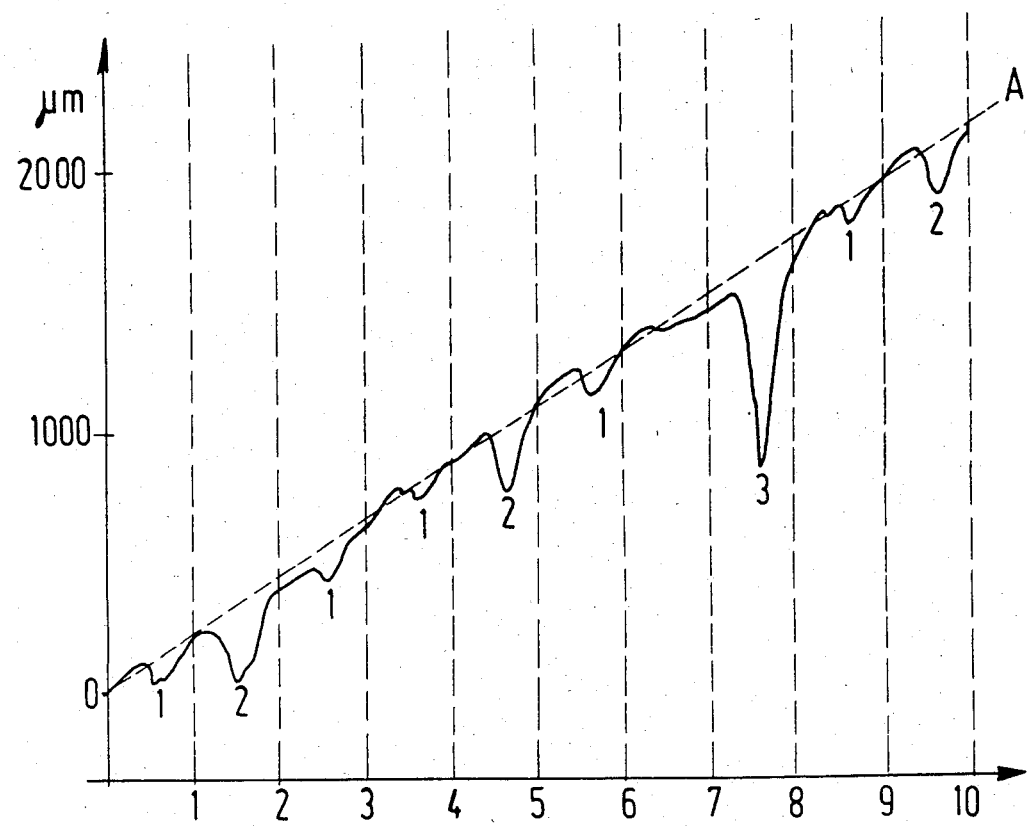
FIG. 3 is a graph showing the variations in the diameter of a fruit as a function of time.

The preferred method is, therefore, to operate on a part of the plant which remains in communication with photosynthesis. FIG. 3 illustrates this mode of operation. This Figure shows the variations in diameter of a fruit which are recorded over ten days. It will be seen that superimposed on a uniform growth indicated by the broken line A are daily variations corresponding to a minimum diameter towards the middle of the day.

Some of these minimum values designated by 1 are only slightly pronounced and are of the order of 100 microns, corresponding to cool days and/or days with only a little sunshine, when evaporation is reduced. Others, designated by 2, are more pronounced (approximately 200 to 300 microns) and correspond to days of bright sunshine. It will be seen that the pronounced minimum values give rise to a recovery at night and even to a stronger total daily growth than on days with only a little sunshine, thus showing a more intense photosynthesis.

The curve has at 3 a much more pronounced minimum which, at the same time as visual observation of the state of dryness of the soil, justified an additional delivery of water. This resulted in a recovery of diameter which was virtually immediate (after a few minutes only) and allowed the curve to return to the straight line A representing average growth. It will therefore be seen that, if the threshold of decreasing diameter is set at a value of the order of 400 to 500 microns, irrigation can be triggered in time to prevent irreparable damage to the crop, whilst at the same time avoiding needless irrigation when the plant no longer requires it.

It will also be noted that there is no need to detect the climatic parameters, since the plant itself acts as a sensor and integrates all the parameters useful to it, solely in their respective proportions.

Figure 4:
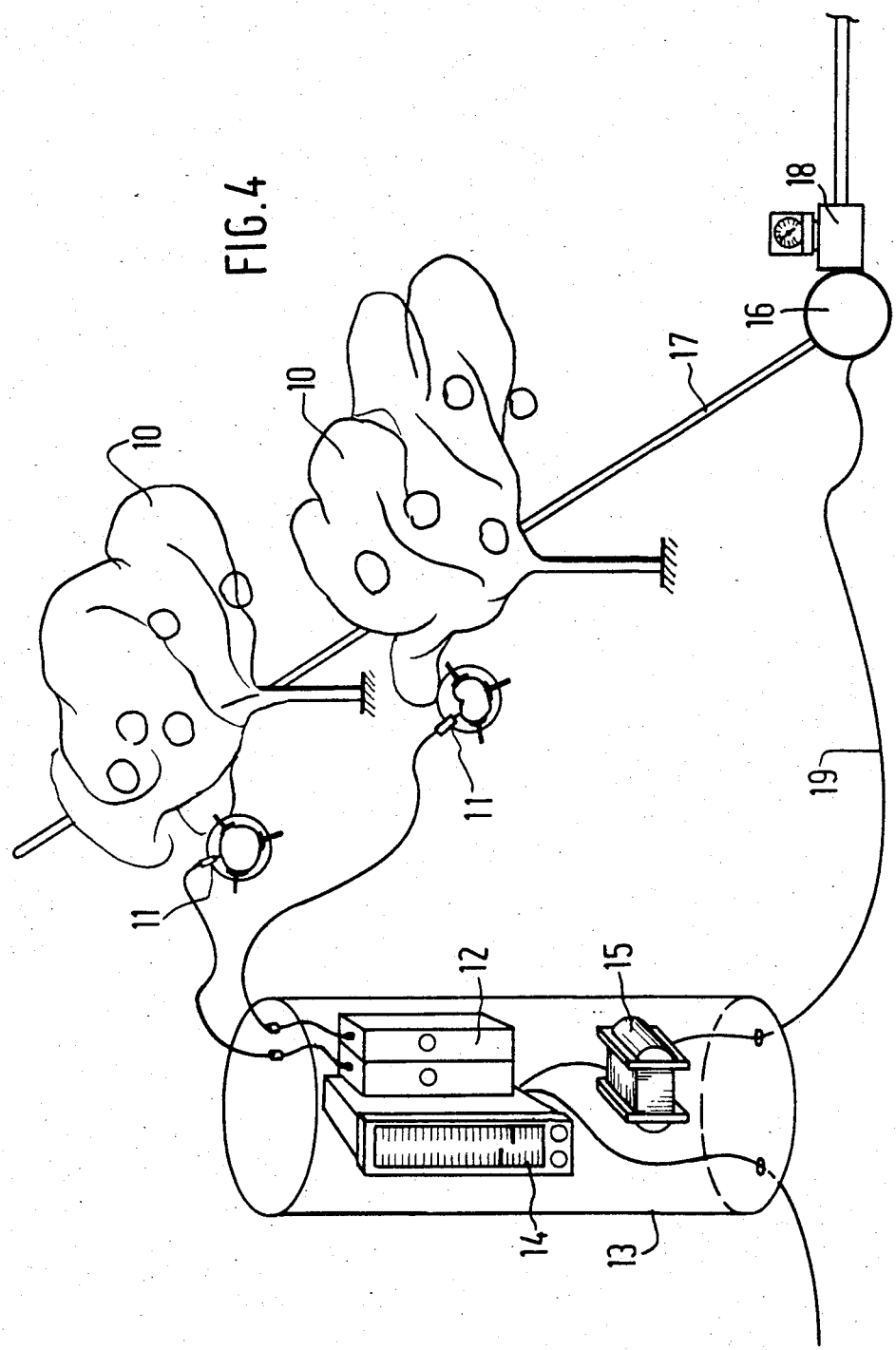
FIG. 4 is a diagrammatic view of an installation for carrying out the process of the invention.

FIG. 4 shows a general diagrammatic view of a plantation irrigated according to the process of the invention.

Two trees 10 in the plantation are equipped with diameter variation sensors 11, each located on a fruit. Such sensors will be described later. These sensors are connected to a control unit 12 placed in a box 13 which, in practice, takes the form of a small-size set with a height of 600 mm and a diameter of 200 mm. The characteristics of the control unit in an embodiment which of course is given only purely as an indication are set out in the following table:

Supply: 24 volts alternating current
Observation period: 24 hours (programmable starting time)
No observation: 30 minutes
Four channels
Measuring range: +5 volts
Sensitivity: 10 mV
Detection of maximum between 0 hour and 12 hours
Measurement of amplitude, comparison with reference amplitude
Detection of minimum over entire range: 24 hours
Display of present rough value (manual switching for reading the various channels) 4 digits+signs
Stabilized direct-current output (12 V) for supplying the sensors
Adjustable reference amplitude
Closure of a contact at the first channel which exceeds the reference amplitude.

This contact triggers irrigation by means of interposed relays.

Main components 6809 byte Motorola microprocessor
2 K octet RAM
4 K octet REPROM
4 analog inputs per voltage/frequency converter (12 bits equivalence).

This control unit is intended for interacting with sensors of the series CD25 produced by Enertec-Schlumberger or the like.

When the dimensional variations are measured on a member isolated from photosynthesis, the box is equipped not with the amplitude detector described above, but with an adjustable-threshold millivoltmeter 14, preferably with a luminous dial, for example of the type ENA 100 F of the company A.O.I.P.

The box also incorporates a transformer 15 having a 24 V output.

In addition to the control box, the apparatus for the immediate control of irrigation possesses a solenoid valve 16, located on an irrigatiod pipe 17, and a volumeter 18. The opening of the solenoid valve is controlled by the control unit 12 via a connecting cable 19, and its closing is controlled by the volumeter which is activated after a predetermined quantity has been delivered. In fact, it is not necessary to vary this quantity according to the instantaneous requirements of the plants, provided that the quantity of water arranged can at least satisfy the maximum requirements of one day. Depending on the circumstances, the pilot trees 10 will themselves trigger irrigation on the next day or on another day of the series, according to requirements. The number of trees 10 and sensors 11 is two here. It will be noted that the equipment described is intended for four sensors. It is within the competence of the operator to determine the appropriate number.

Figure 5:
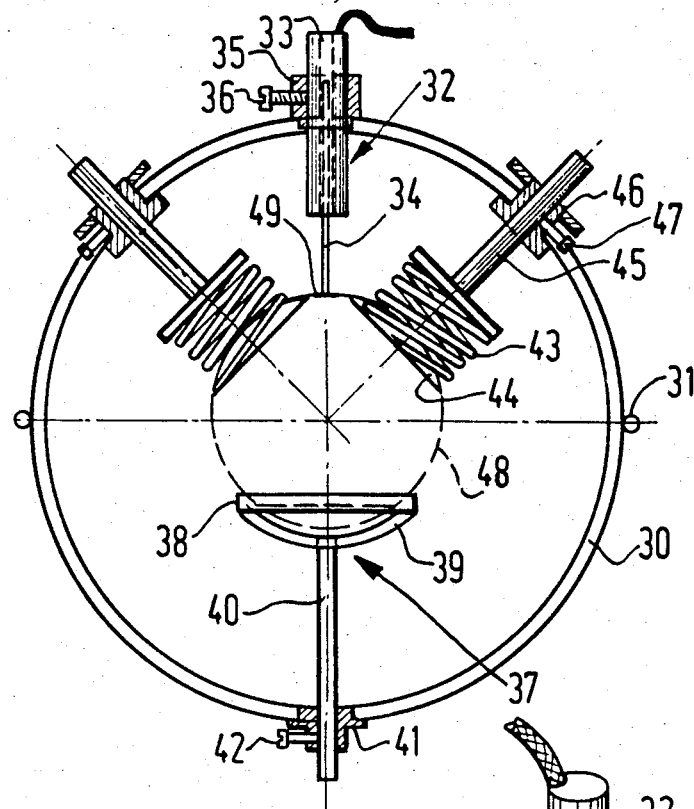
FIG. 5 is an elevation view of a first embodiment of the displacement sensor.

FIG. 5 shows a sensor intended for measuring the variations in dimensions of fruit, such as apples, oranges or the like, although it is possible to alter its size to make it suitable for fruit of different dimensions. The ring 30 is made of "Invar" metal with a coefficient of expansion which is practically zero under usual conditions. It is formed by two closed parallel circles connected to one another by means of spacers 31 and by means of the fastenings of the various other components which will be discussed.

The actual sensor 32, which in a practical embodiment is of the type CD 25 of the Enertec company, has a first cylindrical component or body 33, possessing windings designed to be supplied with current of a frequency of 1 to 20 kHz, and a second component or rod 34 which slides in the body. The body is mounted in a bore of a support block 35 integral with the ring 30 and provided with a locking screw 36, this support block being arranged in such a way that the rod can move in the direction of the geometrical center of the ring 30.

A bearing piece 37, also made of "Invar", consists of a collar 38 integral with a stirrup 39, itself supported by a rod 40 which can slide in the bore of a second support block 41 fixed to the ring 30 at a point diametrically opposite the support block 35 of the sensor 32 and provided likewise with a locking screw 42. The bearing piece can be thus be displaced in the direction of the geometrical center of the ring 30 and immobilized in the selected position.

Two helical springs 43 working by compression carry at one of their ends a concave cup 44 and are supported at the opposite end by a rod 45 directed towards the geometrical center of the ring 30 and adjustable in terms of its radial position relative to this ring by means of a support block 46 and a locking screw 47. The support blocks are located substantially at 120° from the support block 41.

A circle marked by a broken line and representing the contour of the fruit 48 being studied is drawn on the Figure. It will be seen that it is maintained substantially at the center of the ring 30 by means of the bearing piece.

The connection between the fruit 48 and the rod 44 of the sensor is made simply by means of a small piece of double-face adhesive tape 49.

It will be noted that the apparatus does not measure exactly the variations in diameter of the fruit 48, but the variations in the distance between the plane of the collar 39 and the end of the rod 34.

Because these parameters are closely linked, the difference is unimportant.

Figure 6:
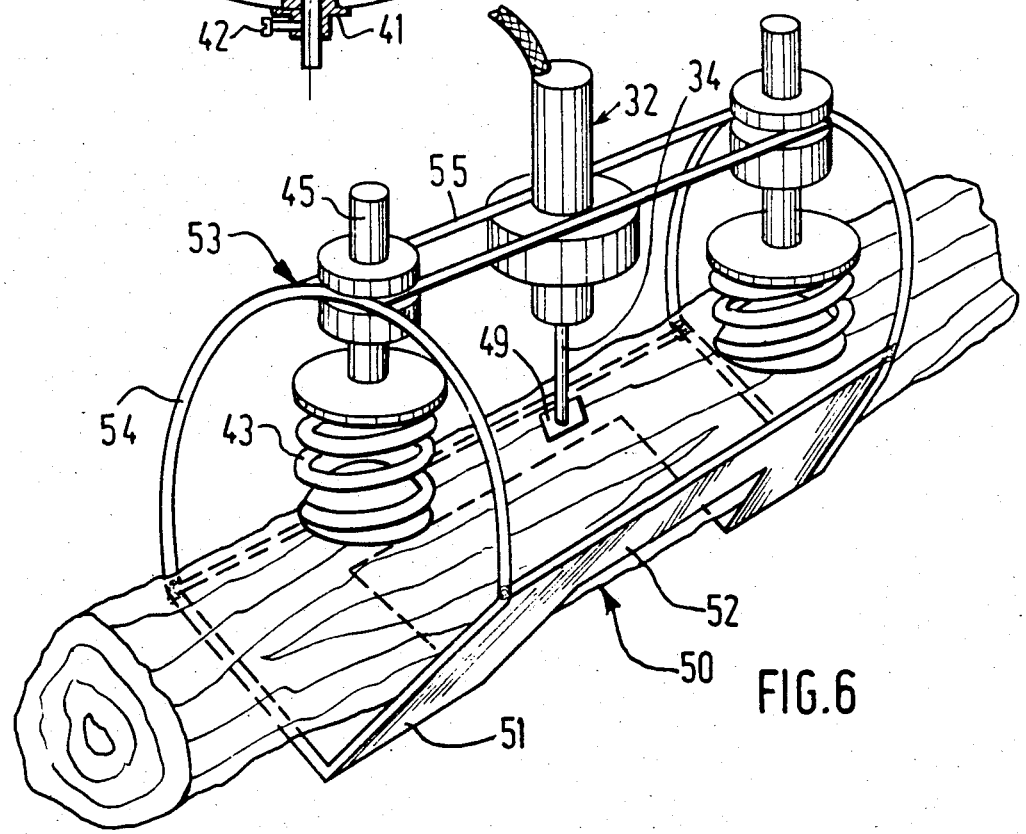
FIG. 6 is a perspective view of a second embodiment of the displacement sensor.

FIG. 6 relates to another embodiment of the sensor intended for interacting with an article of elongate shape, such as a stem, branch or trunk. The same reference numerals designate the same parts here as in FIG. 5.

The ring 30 has a different shape from that of FIG. 5, to take into account the shape of the article and the problems of installation. It comprises two components, both made of "Invar": a cradle 50 of V-shaped cross-section consists of two end parts 51 connected by means of two spacers 52. An arch 53 is likewise formed by two end bows 54 approximately shaped as a semicircle and connected by means of spacers 55. The bows are articulated on the cradle 50 at one of their ends, and their opposite end is connected removably to the cradle, to make it possible to introduce a branch inside the assembly.

The actual sensor 32 is carried by the spacers 55, and the springs 43 are likewise carried by the same spacers, on either side of the sensor in the longitudinal direction. The rod 34 of the sensor and those of the springs 43 are directed towards the center of the V formed by the cradle 50. It will be seen that the cradle 50 performs the function both of part of the ring 30 and of the bearing piece 37. In fact, a branch 56 comes directly up against this cradle.

What is claimed is:

1. A process for irrigating plant crops which comprises the following steps:
   (a) measuring daily variations in diameter of a specific part of a plant that reflects water requirements and resources of the plant as a whole,
   (b) determining a maximum daily decrease in the diameter, corresponding to lack of any need for irrigation, climatic influences being taken into account,
   (c) fixing a threshold valve for the decrease so that, when said decrease exceeds the threshold value, a deficiency of irrigation is presumed,
   (d) comparing each measured decrease with said threshold value and forming a control signal when the threshold value is exceeded,
   (e) triggering irrigation and delivering a predetermined quantity of water when the control signal is formed.

2. A process as claimed in claim 1, wherein the specific part of the plant is at least one fruit, and wherein the threshold value corresponds to a predetermined decrease in the diameter of the fruit.

3. A process as claimed in claim 1, wherein the specific part of the plant is an elongate plant part and wherein the threshold value corresponds to a decrease in the diameter of said plant part.

4. A process as claimed in claim 3, wherein the elongate plant part is a stem, branch or trunk.

5. A process as claimed in claim 1 wherein the specific part of the plant is one which has been separated from the plan: by bank interruption.

6. A process as claimed in claim 1, wherein the specific part of the plant is one which remains in communication with photosynthesis, and wherein the threshold value is fixed by taking, as a start-point, a value of said diameter ascertained from variations during the preceding day.

7. A process as claimed in claim 6, wherein the starting point is an extreme value reached during the preceding night after midnight.

8. An apparatus for irrigating plant crops which comprises:
   (a) means for measuring daily variations in diameter of a specific part of a plant that reflects water requirements and resources of the plant as a whole, (b) means for determining a maximum normal daily decrease in the diameter of a plant part when the plant is not under stress for lack of water, climatic influences being taken into account, (c) means for establishing a threshold value for the decrease so that, when said decrease exceeds the threshold value, a deficiency of irrigation is indicated, (d) means for comparing each measured decrease with said threshold value, (e) control means for triggering irrigation and delivering a predetermined quantity of water when the threshold value is exceeded.

9. An apparatus for irrigating plant crops which comprises:

(a) means for measuring the amplitude of daily variations in diameter of a specific part of a plant which reflects water requirements and resources of the plant as a whole.

(b) a control unit comprising comparator means for comparing said measured amplitude of daily variations in diameter with a predetermined threshold value which indicates a need for irrigaiton, the control unit emitting a control signal in response to a signal from the comparator means when the measured daily variations exceed said threshold value;

(c) irrigation means with a control valve associated with a volumeter for controlling delivery of a predetermined quantity of water to the plant crops; the control unit controlling opening of the control valve in response to the control signal, the volumeter controlling closing of said control valve after delivery of the predetermined quantity of water.

10. An apparatus as claimed in claim 9 wherein the means for measuring the amplitude of daily variations in diameter comprises a displacement sensor and means for supporting the sensor in a fixed position relative to the specific part of the plant.

11. An apparatus as claimed in claim 10 wherein the displacement sensor measures the diameter of the specific part of the plant and the control unit compises means, operating in periods of twenty-four hours, for determining the maximum value of said diameter over the first twelve hours and means for determining a threshold value by substracting a predetermined quantity from said maximum, said control signal being emitted when the diameter falls below the threshold value.

12. An apparatus for irrigating plant crops and comprising:

(a) irrigation means for delivering a predetermined quantity of water in response to a control signal;

(b) means, comprising a displacement sensor, for determining the amplitude of daily variations in diameter of a specific part of a plant, the displacement sensor comprising first and second components and means sensitive to relative linear displacement of the first and second components, the first component being movable linearly relative to the second component;

(c) a control unit for emitting the control signal when the daily variation in diameter exceeds a predetermined threshold value;

(d) supporting means, for said displacement sensor, comprising a rigid ring and a bearing piecd, the rigid ring being integral with the first component of said displacement sensor and made of a material with a low coefficient of expansion; and the bearing piece being fixed to said ring at a point which is approximately diametrically opposite to the displacement sensor;

(e) pushing means for applying said bearing piece toward a first part of said specific part of the plant and maintaining said first component in an invariable position relative to said first part; and (f) retraction means for maintaining said second component in an invariable position relative to a second part of said specific part of the plant diametrically opposed to said first part.

13. An apparatus as claimed in claim 12, wherein said displacement sensor is mounted in a support block integral with said ring and is provided with means for adjusting the position of said second component in the direction of the geometrical center of the ring.

14. An apparatus as claimed in claim 12, wherein said bearing piece is provided with means for adjusting and immobilizing its position in the direction of the geometrical center of said ring.

15. An apparatus as claimed in one of claims 12, 13 and 14, wherein said specific part of the plant is a plant part of approximately spherical general form, said bearing piece having approximately the shape of a circular collar, being located in a plane perpendicular to that of the ring and having an axis which is directed toward the first component.

16. An apparatus as claimed in claim 12, wherein said pushing means consist of several springs placed at different locations on the ring and exert forces which converge toward the center of the ring.

17. An apparatus as claimed in one of claims 12, 13 and 14, wherein said specific part of the plant is an elongate plant part said bearing piece is constituted by a zone of said ring diametrically opposite the first component and having a V-shape.

18. An apparatus as claimed in claim 17 wherein the elongate plant part is a stem, branch or trunk.

19. An apparatus as claimed in claim 17, wherein said ring extends on at least one side of the location of the first component, and said pushing means comprise at least two springs located on each side of said first component in the longitudinal direction of the ring.

20. An apparatus as claimed in claim 12, wherein said retention means comprise an adhesive means placed between said second component and the second part of said specific part of the plant.

21. An apparatus as claimed in claim 9, wherein said displacement sensor comprises a resilient bracelet placed for encompassing said specific part of the plant and provided with strain gauges sensitive to a variation of length or shape of said bracelet.

22. An appartaus according to claim 21, wherein said resilient bracelet is a resilient metallic member having a non-closed annulus form and which engages said specific part of the plant by at least two places on its internal face.

* * * * *